Figure 1:
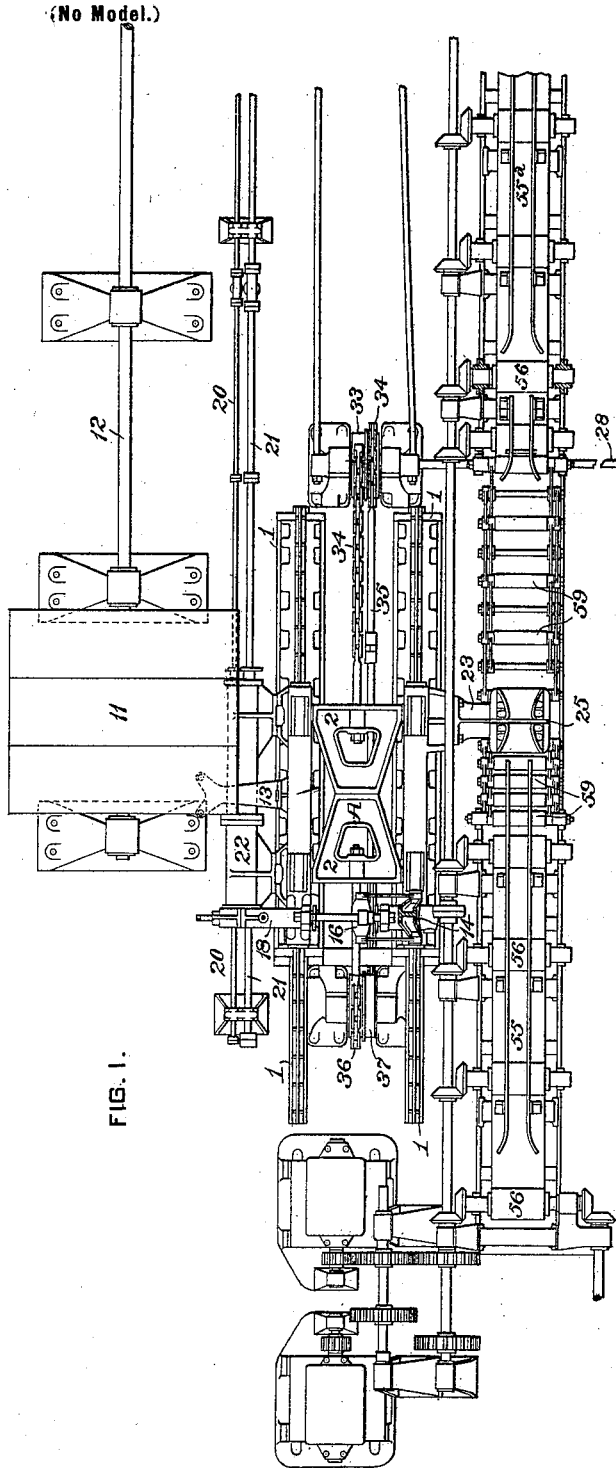

No. 619,520. Patented Feb. 14, 1899.
M. P. M. VEILGAARD & T. McDONALD.
CUTTING APPARATUS.
(Application filed Apr. 26, 1898.)
(No Model.) 6 Sheets—Sheet 1.

WITNESSES:
Chas. F. Miller
Wm. H. Erskine

INVENTORS
Mads P. M. Veilgaard
Thomas McDonald
by Darwin S. Wolcott
Att'y.

No. 619,520. Patented Feb. 14, 1899.
M. P. M. VEILGAARD & T. McDONALD.
CUTTING APPARATUS.
(Application filed Apr. 26, 1898.)
(No Model.) 6 Sheets—Sheet 2.
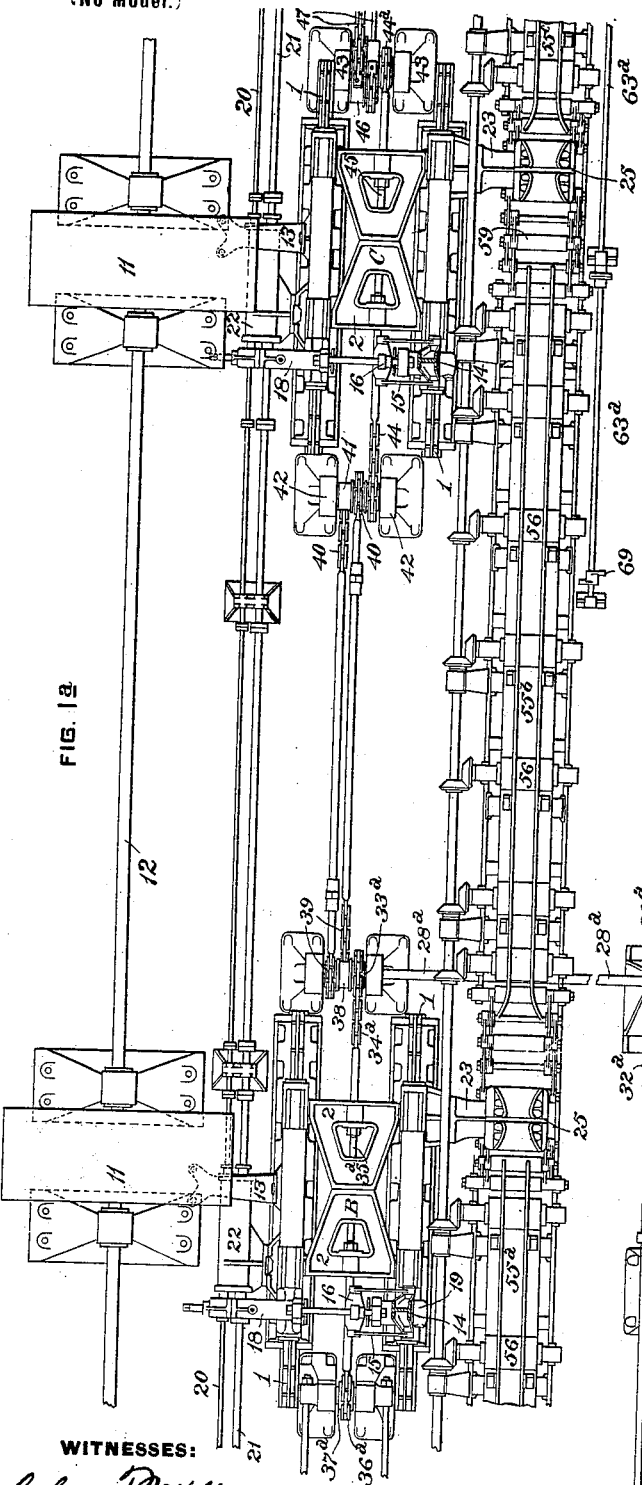
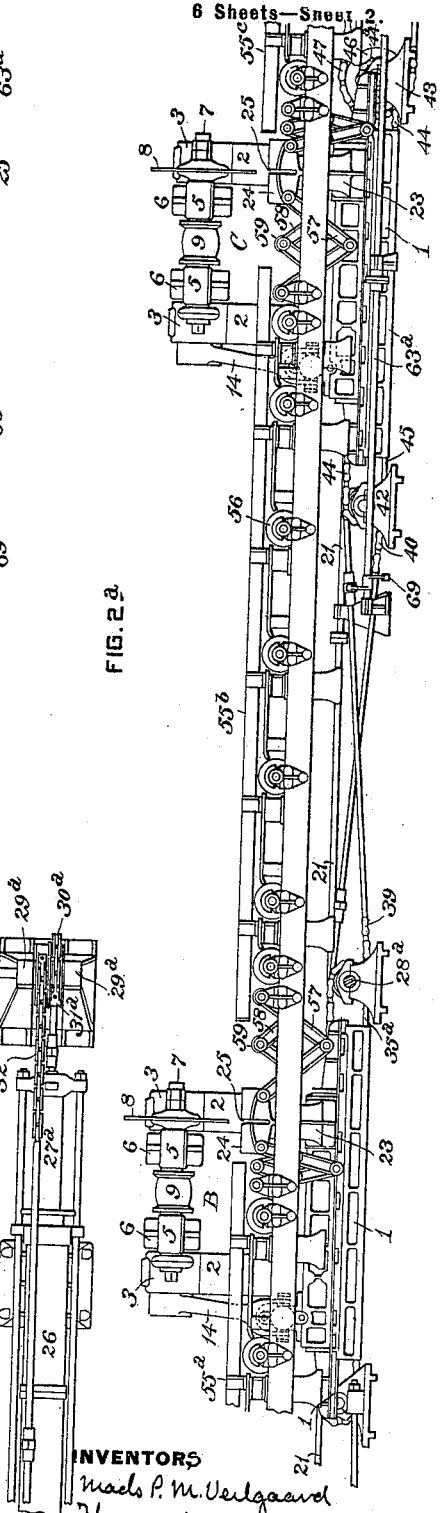
WITNESSES:
Chas. F. Miller
Wm H Erskine
INVENTORS
Mads P. M. Veilgaard
Thomas McDonald
by Dennis S. Wolcott
Att'y.
THE NORRIS PETERS CO., PHOTO-LITHO., WASHINGTON, D. C.

No. 619,520. Patented Feb. 14, 1899.
M. P. M. VEILGAARD & T. McDONALD.
CUTTING APPARATUS.
(Application filed Apr. 26, 1898.)
(No Model.) 6 Sheets—Sheet 3.
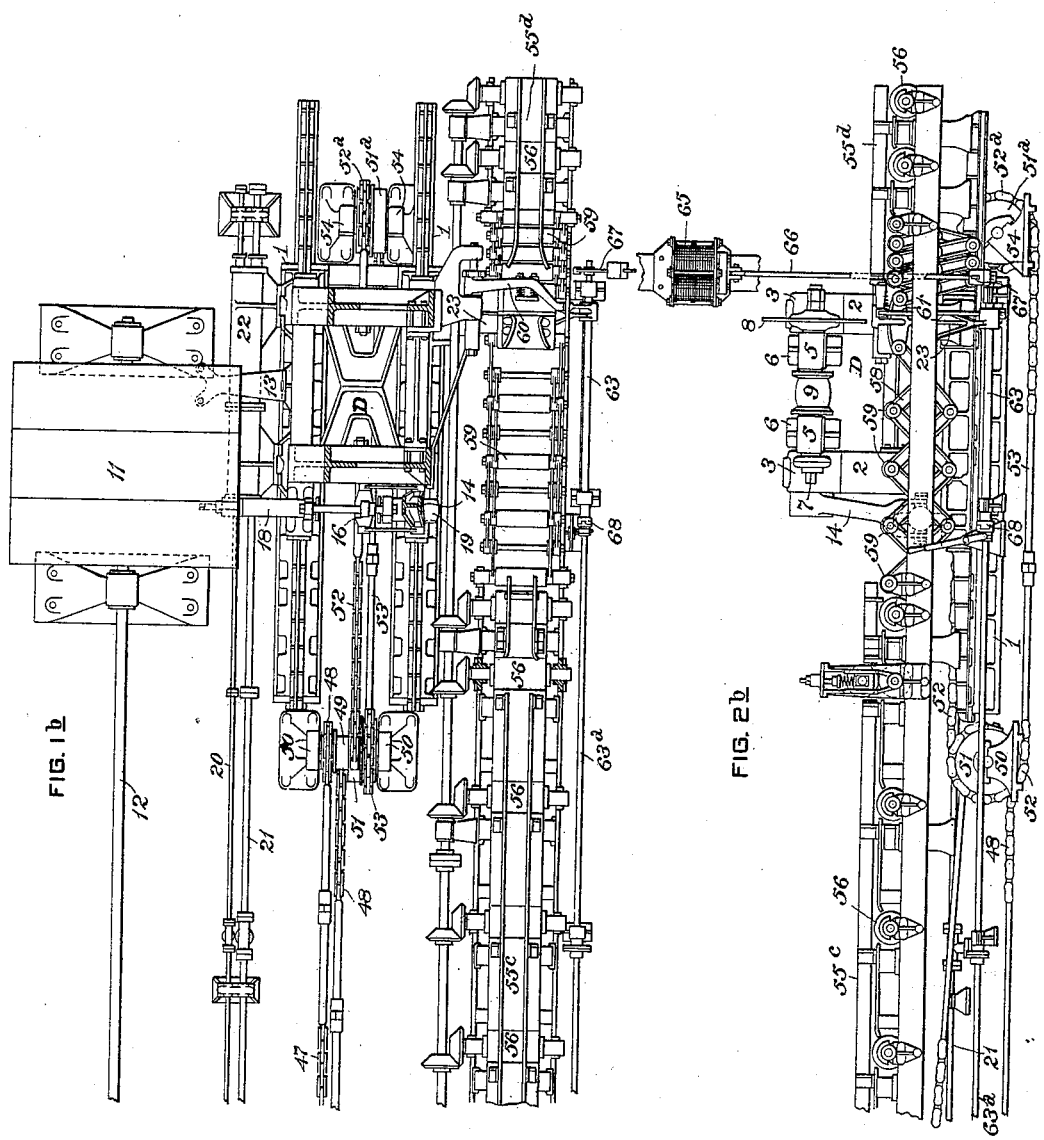
WITNESSES: INVENTORS
Chas. F. Miller. Mads P. M. Veilgaard
W. H. Erskine Thomas McDonald
by Danwin S. Wolcott
Att'y.

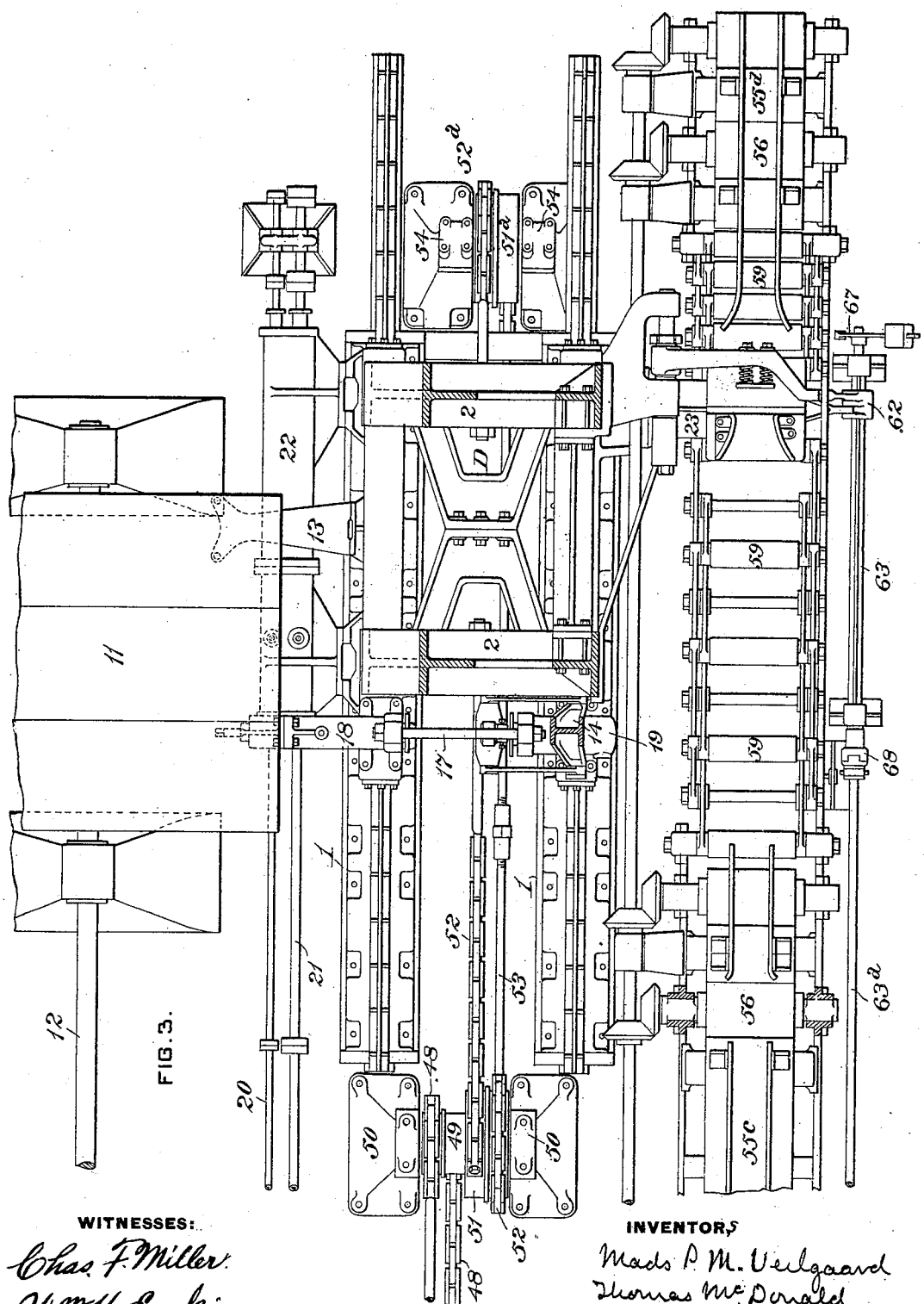

No. 619,520. Patented Feb. 14, 1899.
M. P. M. VEILGAARD & T. McDONALD.
CUTTING APPARATUS.
(Application filed Apr. 26, 1898.)
(No Model.) 6 Sheets—Sheet 5.
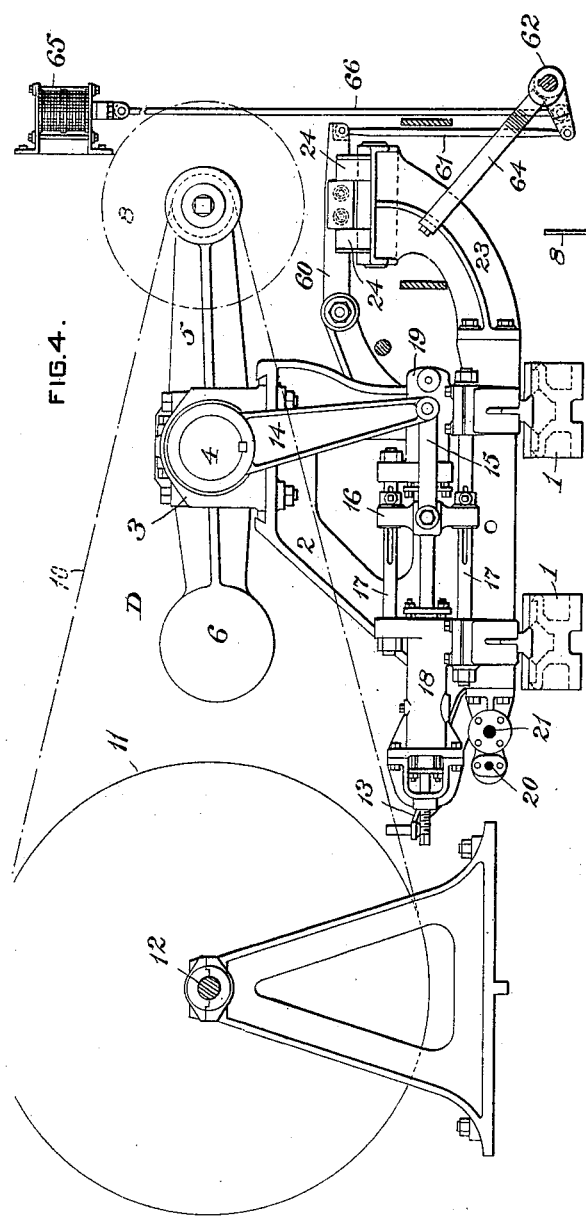
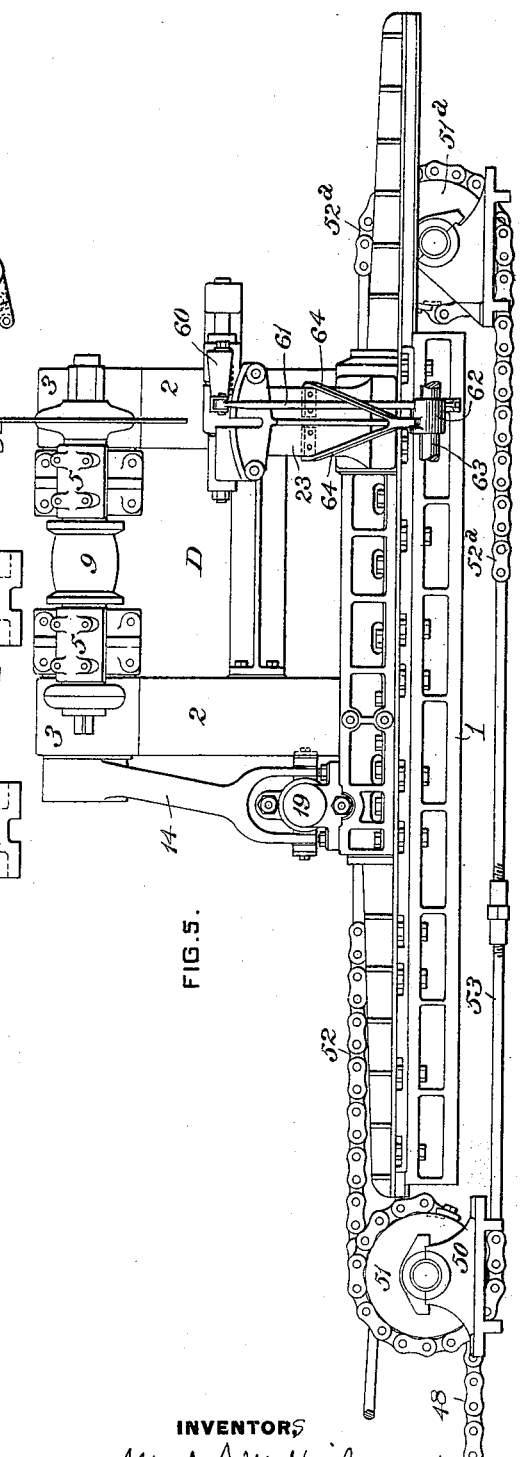
WITNESSES:
Chas. F. Miller
W. M. Erskine
INVENTORS
Mads P. M. Veilgaard
Thomas McDonald
by Darwin S. Wolcott
Att'y.
THE NORRIS PETERS CO., PHOTO-LITHO., WASHINGTON, D. C.

No. 619,520. Patented Feb. 14, 1899.
M. P. M. VEILGAARD & T. McDONALD.
CUTTING APPARATUS.
(Application filed Apr. 26, 1898)
(No Model.) 6 Sheets—Sheet 6.

WITNESSES: Chas. F. Miller. Wm. H. Erskine.

INVENTORS. Mads P. M. Veilgaard Thomas McDonald by Darwin S. Wolcott Att'y.

UNITED STATES PATENT OFFICE.

MADS P. M. VEILGAARD AND THOMAS McDONALD, OF YOUNGSTOWN, OHIO, ASSIGNORS TO THE OHIO STEEL COMPANY, OF SAME PLACE.

CUTTING APPARATUS.

SPECIFICATION forming part of Letters Patent No. 619,520, dated February 14, 1899.

Application filed April 26, 1898. Serial No. 678,850. (No model.)

*To all whom it may concern:*

Be it known that we, MADS P. M. VEILGAARD, a citizen of Denmark, and THOMAS McDONALD, a citizen of the United States, residing at Youngstown, in the county of Mahoning and State of Ohio, have invented or discovered certain new and useful Improvements in Cutting Apparatus, of which improvements the following is a specification.

The invention described herein relates to certain improvements in mechanism for the simultaneous cutting of bars, plates, rails, &c., into a number of sections of equal lengths. In the manufacture of such articles it is customary to reduce the ingot to the desired cross-sectional shape and dimensions, and in such reduction an elongation of one hundred feet, more or less, is effected. These long lengths are then divided into sections of equal length. The lengths of the sections will vary in order to avoid waste, in accordance with the length of bar, plate, or other article produced and in accordance with the requirements of trade. As, for example, if the reduction of an ingot to the desired cross-sectional size and shape should result in the production of a bar or other article one hundred feet in length after the cross ends have been removed an economical division of the bar could be effected by cutting it into sections of a length equal to some multiple of hundred, as twenty or twenty-five foot sections. On the other hand, if the next bar or other article should be ninety or one hundred and twenty feet long after the removal of the cross ends it could be economically divided into sections twenty or thirty feet long. Also, the orders which a mill may have may require a frequent change or adjustment of the cutting mechanisms—as, for example, one order may call for thirty-foot sections and the next order for sections of a different length, as twenty-seven feet. It is evident that by employing adjustable cutting mechanisms these requirements can be fully met; but to prevent loss of time the several mechanisms should be adjusted simultaneously. If each cutting mechanism could be shifted the same distance, the simultaneous movements of the several mechanisms could be easily effected; but in order to produce sections of different lengths and also to insure that the several sections into which a bar is cut shall be of equal length necessitates a different adjustment of each cutting mechanism except perhaps the first or last of the series. Suppose, for example, that the several cutting mechanisms A, B, C, and D were adjusted for cutting a bar into three thirty-foot sections and it became necessary to change them so as to cut the next bar into three sections, each twenty-seven feet long. One or both of the end cutting mechanisms A or D would have to be shifted until the distance between them is equal to eighty-one feet, and the intermediate cutting mechanisms would have to be adjusted until the distance between them and the adjacent end mechanisms is equal to twenty-seven feet. If both end mechanisms should be adjusted toward each other, each would be shifted four and a half feet and the intermediate mechanisms would be shifted toward each other one and a half feet. If, on the other hand, one of the end mechanisms, as A, is stationary, the other mechanisms would have to be shifted different distances, but all toward the mechanism A. The mechanism B would be shifted three feet, the mechanism C six feet, and the mechanism D nine feet.

The object of the present invention is to provide for the simultaneous but varied or different adjustment of a series of cutting mechanisms and also to provide for a corresponding adjustment of the lengths of the feed-table intermediate of the several cutting mechanisms.

The invention is hereinafter more fully described and claimed.

Figure 2:
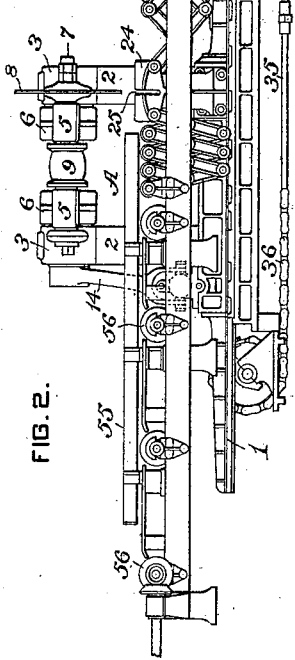
Figure 6:
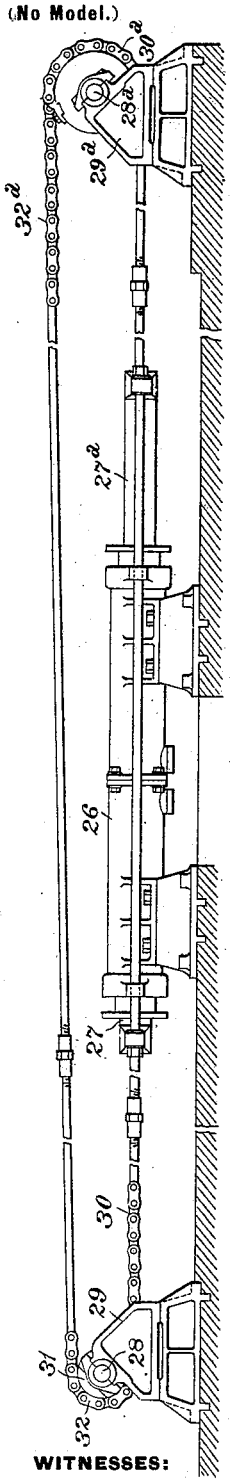
Figure 7:
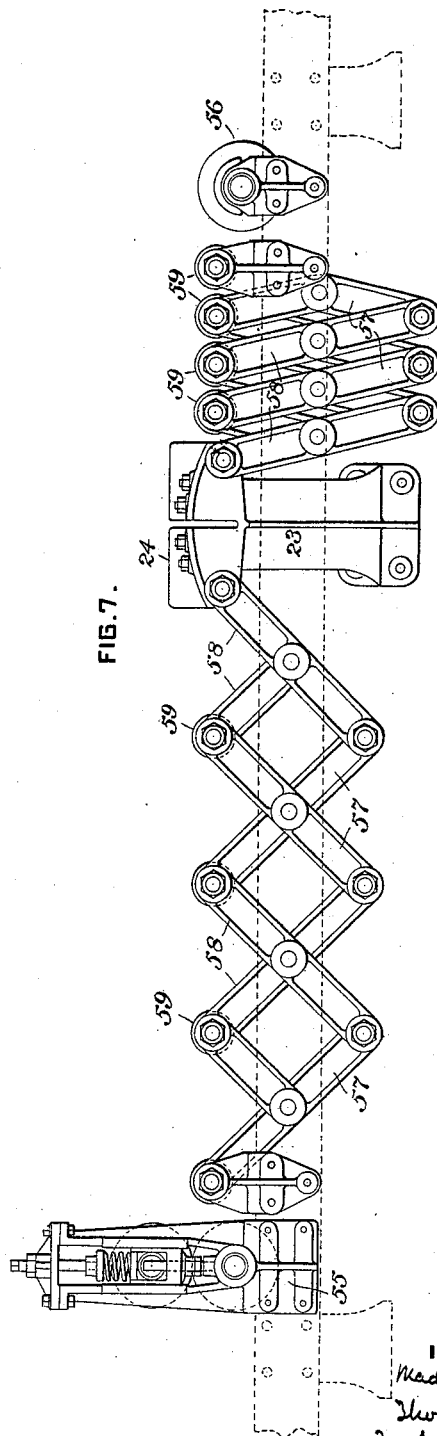
Figure 8:
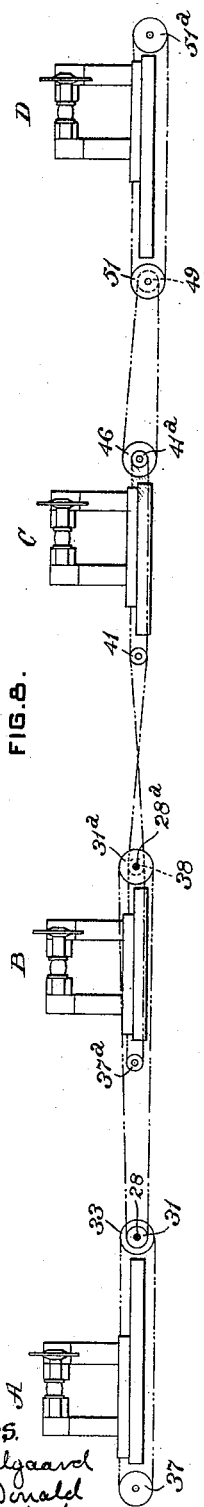

In the accompanying drawings, forming a part of this specification, Figures 1, 1$^a$, and 1$^b$ are sections of the same view, which shows in plan the improved cutting mechanism. Figs. 2, 2$^a$, and 2$^b$ are sections of the same view, which shows the cutting mechanism in side elevation. Fig. 3 is a plan view, on an enlarged scale, of the cutting mechanism at the rear end of the series and its feed-table. Fig. 4 is an end elevation of the cutting mechanism at the end of the series. Fig. 5 is a front elevation of the same with its shifting mechanism. Fig. 6 is a side elevation of the motor and its connections for shifting the cutting mechanism. Fig. 7 is a side elevation of a portion of the feed-table, and Fig. 8 is a diagrammatic view illustrating the manner of adjusting the cutting mechanism.

In the practice of the invention the feed-table for moving the bars, &c., into position in front of the cutting mechanisms is preferably arranged in line with or forms a continuation of the delivery-table of the reducing-rolls. A series of three or more pairs of guides 1 are arranged along one side of the feed-tables at points a distance apart equal to the average length of sections into which the bars produced in the mill are to be divided. Any suitable form or construction of cutting mechanisms are mounted on the guides in such manner as to permit of their being shifted, as hereinafter described. For some purposes a rotary saw is a preferable form of cutting mechanism and is therefore employed for illustrating the invention. On the guides 1 are mounted the supporting-frames 2, and in suitable bearings 3 on the frames are mounted the shafts 4. On these shafts are secured the arms 5, provided with counterbalancing-weights 6 at one end and at the opposite ends with bearings for the shafts 7. Saws 8 are secured on one end of these shafts, which also have belt-pulleys 9 keyed thereon between the arms. Belts 10 are passed around these pulleys and the driving-pulleys 11 on the power-shaft 12, which may be driven by any suitable mechanism. The driving-pulleys 11 are made with width of faces proportional to the amount of probable adjustment of the saws, and the belts are shifted along these pulleys by arms 13, secured to the supporting-frames 2 and provided at their outer ends with fingers projecting over opposite edges of the belts.

Arms 14 have one end keyed to the shafts 4 and their opposite ends connected by links 15 to cross-heads 16, which are mounted on suitable guide-bars 17, which are also employed for tying together the cylinders 18 and 19, secured on the supporting-frames 2. The plungers or pistons of these cylinders are connected to the cross-heads 16. These cylinders are connected to the fluid-pressure pipes 20 and 21, which are provided with extensible joints formed by chambers or passages in the blocks 22, secured to the supporting-frames 2. The ends of the sections of the pipes 20 and 21 project through stuffing-boxes into the passages or chambers in the blocks 22, which are made of a length proportional to the probable range of adjustment of the saws.

On the fronts of the supporting-frames 2 are secured arms or brackets 23, provided at their upper ends with fingers 24, adapted to hold the bar in place while being sawed and with transverse vertical slots 25 for the passage and guidance of the saw.

While the cutting mechanisms and the means employed for operating may be constructed and arranged so that one of the end cutting mechanisms will be stationary and the other mechanisms shifted toward and from the stationary cutter, it is preferred to construct the shifting mechanisms so that all the cutting mechanisms will be moved toward and from a common center, thereby avoiding an excessive movement of any of the cutting mechanisms. It will of course be understood that in case an uneven number of cutting mechanisms, as five or seven, are employed, the middle mechanism will be stationary, forming the common center toward and from which the other cutting mechanisms will be adjusted.

A convenient form or construction of mechanism for adjusting the cutting mechanisms consists of a fluid-pressure cylinder 26, arranged in convenient proximity to the cutting mechanisms. The piston of this cylinder is provided with piston-rods 27 and $27^a$, extending through opposite ends of the cylinder. Shafts 28 $28^a$ are mounted in suitable bearings 29 $29^a$, arranged, respectively, a short distance from the ends of the cylinder. These shafts are adapted to be rotated by the piston of the cylinder, and a convenient manner of effecting such rotation consists of chains 30 $30^a$, having one end connected to the rods 27 $27^a$ and their opposite ends to drums 31 $31^a$, the chains being passed around or partially around the drums before being secured thereto. In order to obtain a reverse rotation of the drums, chains 32 $32^a$ have one end secured to the drums and their opposite ends connected together, the chains passing around the drums in a direction the reverse of the chains 30 and $30^a$.

As shown in Figs. 1 and $1^a$, the shafts 28 and $28^a$ are extended to intersect the lines of movement of the cutting mechanisms, and on the shafts are secured drums 33 $33^a$. Chains 34 $34^a$ are wrapped around the drums 33 $33^a$ and have one end connected to the supporting-frames 2 of the cutting mechanisms A and B, and their opposite ends are connected by rods 35 $35^a$, passing under the frames 2, to the ends of chains 36 $36^a$, wrapped around drums 37 $37^a$. The other ends of the chains 36 $36^a$ are connected to the supporting-frames. The drums 33 and 37 are arranged a little beyond the opposite ends of the movement of the cutting mechanism A, and the drums $33^a$ and $37^a$ are similarly arranged with reference to the cutting mechanism B.

A drum 38, having a chain 39 wrapped around it, is keyed on the shaft $28^a$ alongside of the drum $33^a$. The ends of the chain 39 are connected to the ends of a chain 40, wrapped around a drum 41, keyed to a shaft mounted in bearings 42, located at one end of the guides for the cutting mechanism C. A similar drum $41^a$ has its shaft mounted in bearings 43 at the opposite end of the guides of this cutting mechanism. Chains 44 and $44^a$ are wrapped around these drums 41 and $41^a$, each having one end connected to the cutting mechanism C. The opposite ends of these chains are connected together, preferably by a rod 45, passing under the mechanism C.

A drum 46 is keyed on the shaft with drum 41$^a$, and around it is wrapped a chain 47, having its ends connected to the ends of a chain 48, wrapped around the drum 49, which has its shaft mounted in bearings 50, arranged at one end of the guides 1 of the cutting mechanism D. On the shaft with the drum 49 is secured a drum 51, having a chain 52 wrapped around it. One end of this chain is connected to the frame 2 of the cutting mechanism D, and its opposite end is connected by a rod 53 to one end of a chain 52$^a$, passing one or more times around a drum 51$^a$ and having its opposite end connected to the frame 2 of mechanism D. The shaft of the drum 51$^a$ is mounted in bearings 54 at the end of the guides 1 of the mechanism D.

When employing the mechanism shown in Figs. 1, 1$^a$, and 1$^b$ for shifting the cutting mechanisms, provision is made by suitably proportioning the several actuating and transmitting drums to effect the desired movements of the cutting mechanisms. As hereinbefore stated, the cutting mechanisms A and D will have a movement toward and from each other approximately three times the desired movements of the intermediate mechanisms D and C. It will be observed that the mechanism A is shifted by the drum 31, operating through the shaft 28, while the mechanisms B, C, and D are shifted by the drum 31$^a$, operating through the shaft 28$^a$. Hence the drums 31, 33, and 37 are proportioned to obtain the desired movement of the mechanism A; but the drum 31$^a$ is made of such a size peripherally as to effect not only the shorter movements of the mechanisms B and C, but also the relatively greater movement of the cutting mechanism D. By reference to the diagrammatic view in Fig. 8 it will be seen that motion is transmitted from a comparatively small drum 31 to larger drums 33 and 37 to shift the mechanism A. The drum 31$^a$ is made of sufficient size to effect full movement of the mechanism D, such movement being the same as that of the mechanism A. Hence the drums 31$^a$, 33, 37, 51, and 51$^a$ are made with equal perimeters. In order to provide for the lesser movements of the intermediate mechanisms B and C, the drums 33$^a$, 37$^a$, 41, and 41$^a$ are made with equal perimeters, but proportionately less than those of the other drums in proportion to the difference of travel of the two pairs of mechanisms.

It will be readily understood by those skilled in the art that by the use of suitably-proportioned drums the mechanisms B, C, and D can be shifted simultaneously in the same directions, but each a different distance.

In order to feed the bars to be sheared into proper relation to the several cutting mechanisms, a series of feed-tables or sections of feed-tables 55, 55$^a$, 55$^b$, 55$^c$, and 55$^d$ are arranged in line with each other intermediate between the several cutting mechanisms. These several sections of feed mechanism are provided with positively-driven rollers 56 and 70 are made of such a length and are so arranged that the distance between their adjacent end or ends on opposite sides of the brackets 23, secured to the supporting-frame of the cutting mechanisms, will be a little greater than the maximum movement of the several cutting mechanisms. In order to bridge the spaces between the brackets 23 and the ends of the feed mechanisms, a structure similar to what is known as a "lazy-tongs" is employed, as clearly shown in Figs. 1, 2, and 7. The sides of these collapsible sections are formed by two series of bars 57 and 58, pivotally connected together midway of their length. The bars 57 have their ends pivoted to ends of adjacent bars of the series except the end members of the series, which have their outer ends pivotally connected to the brackets 23 and to the ends of the stationary sections of the feed-tables. The bars 58 of the other series have their ends pivotally connected together; but the end members of this series have their outer ends connected to the end members of the other series at a point midway of the length of the latter. These collapsible sections are braced by extending the pins forming the pivotal connections of the bars of one side, so as to form the pivotal connection for the corresponding bars of the other side. These pivot-pins also form bearings for rollers 59, forming antifriction-supports for the bars to be cut. As the end members of only one of the series of bars forming the sides of the collapsible sections are connected at their upper ends to the brackets 23 and the ends of the stationary sections of the feed-tables, the pins connecting the upper ends of the intermediate bars will remain in the horizontal plane with the points of connection to the brackets and stationary feed-tables.

In order to check the movement of the bars at the proper time for being operated upon by the cutting mechanisms and also to permit the onward movement of the dividing-sections, an arm 60 is pivotally mounted upon the supporting-frame 2 of the cutting mechanism D in such relation to the feed mechanism that the arm can be shifted into and out of the path of movement of the bars and sections. The outer end of this arm is connected by a link 61 to an arm on the sleeve 62, so mounted on the shaft 63 as to rotate therewith, but having a freedom of movement longitudinal thereof. In order to shift the sleeve along with the cutting mechanism, an arm 64 is secured at one end to the bracket 23, while its opposite end engages a groove in the sleeve 62, thereby insuring the movement of the sleeve with such cutting mechanism and without any strain to the connections to the arm 60. The shaft 63 is designed to be operated by any suitable means—as, for example, by a solenoid 65, secured to a suitable support above the feed-tables and connected by a rod 66 to an arm 67, fixed on the shaft 63. This shaft is included in the circuit of the motor employed for rotating the rollers 63 of the feed-tables. Provision is made for operating the arm 60 mechanically by a shaft $63^a$, adapted to be connected to the shaft 63 by a clutch 68. The shaft 63 can be rotated by a lever located at some central point and connected to an arm 69 on the shaft $63^a$.

It will be readily understood by those skilled in the art that the relative movements of the cutting mechanisms can be effected by other arrangements and constructions of known mechanical devices, the full mechanical equivalents, as regards their functions or the adjustments to be produced, of the mechanism shown and described. Such equivalent constructions are therefore included under the broad terms of the claims; nor is the invention as claimed limited to the specific construction and arrangement of the mechanisms shown and described for effecting the several functions of the apparatus.

It is characteristic of the improvement set forth herein that the cutting mechanisms which are to be shifted are operated by a "unitary shifting mechanism," and by this term is meant a device or a combination of devices which acts upon each and all of the cutting mechanisms to be adjusted to shift them for purposes of adjustment toward or from the other cutting mechanism or mechanisms.

We claim herein as our invention—

1. The combination of a series of three or more cutting mechanisms, a unitary shifting mechanism conveniently situated with reference to moving two or more cutting mechanisms different distances toward or from the other cutting mechanism, and suitable connections from the shifting mechanisms to each of the cutting mechanisms which are to be adjusted.

2. The combination of a series of three or more cutting mechanisms, and means for simultaneously shifting two or more of said mechanisms different distances toward or from the other mechanism, substantially as set forth.

3. The combination of a series of four or more cutting mechanisms and mechanism for shifting said cutting mechanisms toward or from a common center, the outer mechanisms being shifted a greater distance than the intermediate mechanisms, substantially as set forth.

4. The combination of a series of four or more cutting mechanisms and means for simultaneously shifting said mechanisms toward or from a common center, substantially as set forth.

5. The combination of a series of three or more cutting mechanisms, means for adjusting two or more of said mechanisms, a stationary line of mechanism for feeding bars or other articles to the cutting mechanisms, and two or more sections of adjustable feed mechanisms, substantially as set forth.

6. The combination of a series of three or more cutting mechanisms, means for adjusting two or more of the cutting mechanisms, a series of stationary sections of feed mechanism, and a series of collapsible feed mechanism adjustable by the cutting mechanisms, substantially as set forth.

7. The combination of a series of three or more cutting mechanisms, means for adjusting said mechanisms, stationary sections of feed mechanisms intermediate of the cutting mechanisms, collapsible sections of feed mechanism connected at their ends to the cutting mechanisms and to the stationary sections of the feed mechanism, substantially as set forth.

In testimony whereof we have hereunto set our hands.

M. P. M. VEILGAARD.
THOMAS McDONALD.

Witnesses:
F. E. GAITHER,
DARWIN S. WOLCOTT.